United States Patent [19]

Hartman et al.

[11] Patent Number: 4,630,697
[45] Date of Patent: Dec. 23, 1986

[54] STRAIN GAUGE SCALE

[75] Inventors: Russell D. Hartman, Perkasie; Edward M. Dougherty, Ottsville, both of Pa.

[73] Assignee: Scaletron, Inc., Perkasie, Pa.

[21] Appl. No.: 778,029

[22] Filed: Sep. 20, 1985

[51] Int. Cl.⁴ .................. G01G 3/14; G01G 3/08; G01L 1/22
[52] U.S. Cl. .................. 177/211; 177/229; 73/862.65
[58] Field of Search .............. 177/211, 229, DIG. 9; 73/862.65

[56] References Cited

U.S. PATENT DOCUMENTS

| | | | |
|---|---|---|---|
| Re. 26,302 | 11/1967 | Seed et al. | 73/862.65 X |
| D. 243,750 | 3/1977 | Wasko et al. | |
| 3,439,761 | 4/1969 | Laimins | 73/862.65 X |
| 3,472,329 | 10/1969 | Smith | |
| 3,512,595 | 5/1970 | Laimins | |
| 3,955,638 | 5/1976 | Wasko | |
| 3,960,013 | 6/1976 | Ormond | 177/211 X |
| 3,960,228 | 6/1976 | Nordstrom | |
| 3,993,150 | 11/1976 | Brosh et al. | 177/229 X |
| 4,241,801 | 12/1980 | Kushmuk | 177/DIG. 9 |
| 4,411,326 | 10/1983 | Siegel | 177/229 X |
| 4,476,946 | 10/1984 | Smith | 177/211 X |
| 4,509,610 | 4/1985 | Hayashi | |

FOREIGN PATENT DOCUMENTS 0993087  10/1951  France ................. 177/229

Primary Examiner—George H. Miller, Jr.
Attorney, Agent, or Firm—Kenneth P. Synnestvedt

[57] ABSTRACT

A strain gauge scale is disclosed comprising a platform having two weighing discs, each disc being connected with the platform by means of three load cells, each of which has a multiple component strain gauge associated therewith.

9 Claims, 5 Drawing Figures

STRAIN GAUGE SCALE

BACKGROUND AND STATEMENT OF OBJECTS

This invention relates to a scale and is particularly concerned with a scale incorporating strain gauges.

The invention is particularly concerned with a scale having a plurality, preferably two weighing discs associated with a common platform. While various aspects of the invention are useable for a wide variety of purposes, the invention is particularly useful in the weighing of cylinders for storage and shipment of fluids, especially gases, such as chlorine gas. For this purpose, the arrangement of the invention comprises a base or platform having two weighing discs associated therewith and having an upright support or standard carrying the meters for reading the weights of the cylinders and preferably also having support or fastening means which may be employed to position the cylinders on the weighing discs associated the platform.

One of the objectives of the invention is to provide a load cell suspension mechanism for the individual weighing discs, each disc being suspended from three equispaced load cells, with the load cells for the two discs arranged so as to minimize communication of platform deflections in the region between the two weighing discs, notwithstanding the fact that the two weighing discs are mounted in side-by-side relation on a common supporting platform.

Another object of the invention is to provide load cells for supporting the weighing discs, which cells are specially configured to provide for reduction in the height of mounting the weighing discs, notwithstanding the location of the load cells under the weighing discs. This reduction in the height of mounting the weighing discs is of importance because it makes possible reduction in the height of the platform surrounding the discs and thus facilitates loading and unloading of the articles to be weighed, such as chlorine gas cylinders.

A further objective of the invention is to improve the accuracy and reliability of the individual load cells employed for each weighing disc, each load cell, in accordance with the invention, having associated therewith a multiple component strain gauge, preferably a strain gauge incorporating four components mounted on the load cell in a novel manner providing for minimization of inaccuracy in readings.

The arrangement of the load cells for each individual weighing disc, the manner of suspension of the disc from the platform, and the arrangement of the quadruple component strain gauges on the load cells are features which cooperate in increasing the accuracy of reading and eliminating introduction of inaccuracies in the readings even where multiple weighing discs are associated with a common platform, for reasons which will be more fully brought out hereinafter, following the description of the structure employed according to the present invention.

BRIEF DESCRIPTION OF THE DRAWINGS

How the foregoing objects and advantages are obtained will appear more fully referring to the accompanying drawings, in which.

DETAILED DESCRIPTION OF THE DRAWINGS

Figure 1:
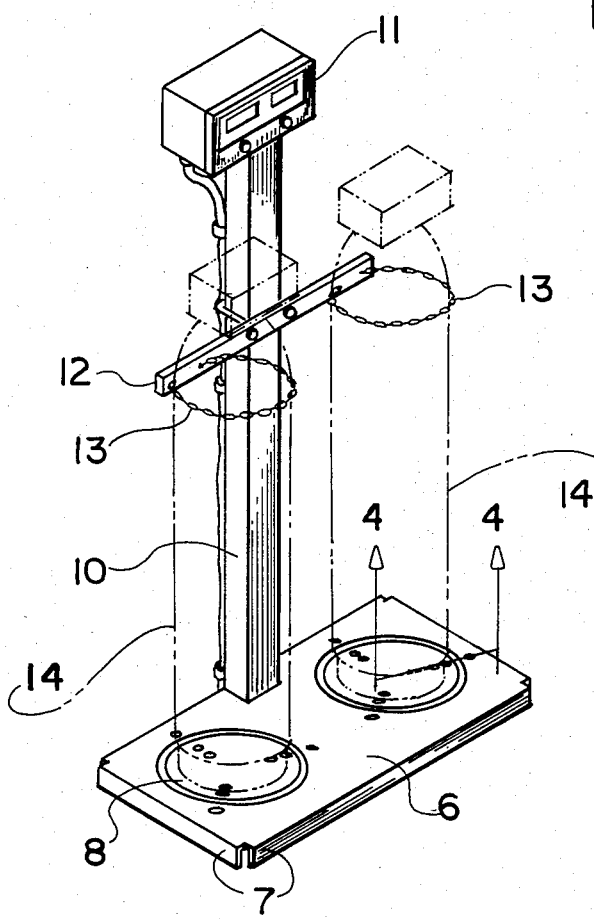
FIG. 1 is an overall outline perspective view of a gas cylinder scale having a platform and a pair of weighing discs associated with the platform, as is contemplated according to the invention.
Figure 2:
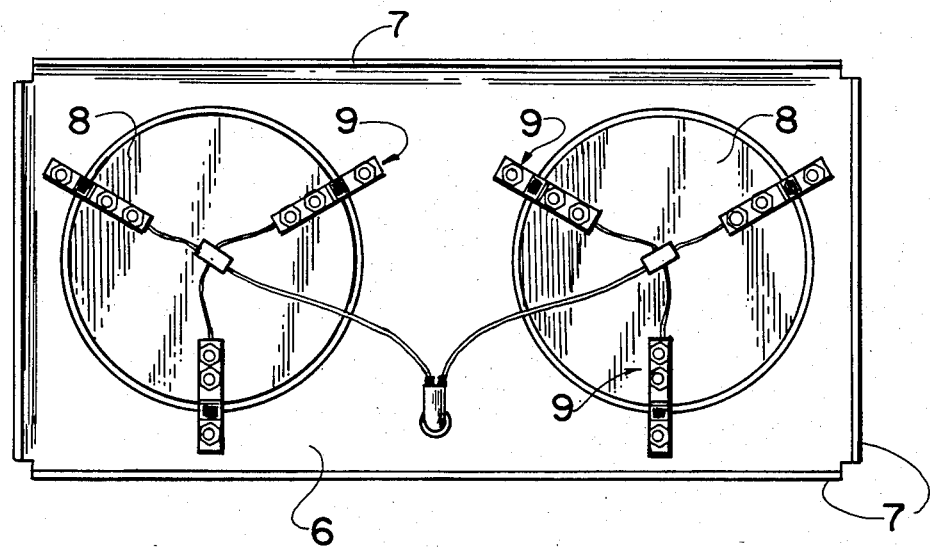
FIG. 2 a bottom view of the platform and weighing discs shown in FIG. 1 and illustrating the distribution and arrangement of the three load cells employed for each platform.

Referring first to FIGS. 1 and 2, a platform is indicated at 6, this platform comprising a metal sheet having edge portions 7 extended downwardly to provide a support for the platform on any suitable substantially level surface. The platform also has a pair of circular cut-outs for receiving the weighing discs 8, each disc being supported within one of the circular cut-outs by means of three equi-spaced load cells generally indicated in FIG. 2 at 9. Toward one edge of the platform, an upright post or standard 10 is mounted, carrying an instrument box 11 at its upper end, preferably having a separate meter for each of the two weighing discs.

The standard 10 may also be provided with a horizontal arm 12 with chain loops 13 adapted to removably position gas cylinders resting on the weighing discs, as is indicated at 14 in dot and dash lines in FIG. 1.

As seen in FIGS. 1 and 2, each weighing disc 8 is suspended from the platform by means of three load cells 9. These load cells are equi-spaced around each platform and are distributed and located in the positions clearly appearing in FIG. 2. Thus, as will be seen in FIGS. 1 and 2, the load cells 9 for each weighing disc are distributed so that two of the cells are presented toward the front edge of the loading platform 6, and the third cell for that disc is centered at the rear edge of the disc. This orientation of the load cells tends to distribute the weight of a load being placed on a disc between the two cells located toward the front edge of the weighing disc, and thereby avoids the concentration of the weight on a single load cell during movement onto the disc, as would occur if only one load cell was positioned toward the front edge of the disc.

The distribution and location of the load cells for each weighing disc, as described above, is still further of special advantage in a weighing mechanism incorporating two side-by-side weighing discs. In explanation of this point, it is to be noted that if the load cells for each of the two side-by-side discs were distributed or located so that one of the load cells for each disc was located close to and presented toward the corresponding cell of the other disc, the placement of a load to be weighed on one disc would tend to transmit forces to the platform area between two discs, which forces could influence weight readings for the other disc. We have found that the distribution of the load cells in the pattern herein illustrated and described (with two cells of each disc located on the front side of the disc), the effect of the irregular forces or deflections introduced into the platform area between the two discs is diminished, with corresponding increase in accuracy of the readings.

Figure 3:
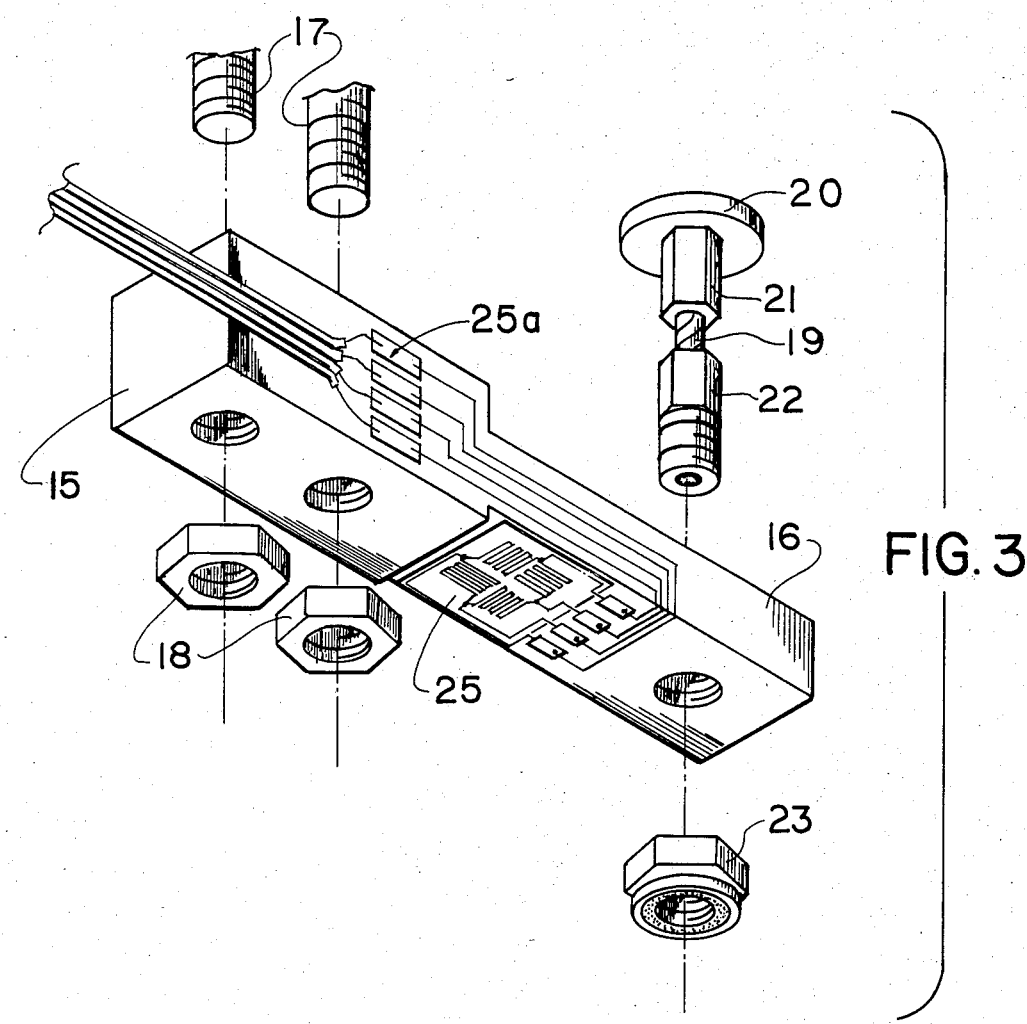
FIG. 3 is an enlarged perspective view of one of the load cells constructed according to the present invention and illustrating in exploded relationship the mounting parts by which the weighing discs are connected with the platform through the load cells.
Figure 4:
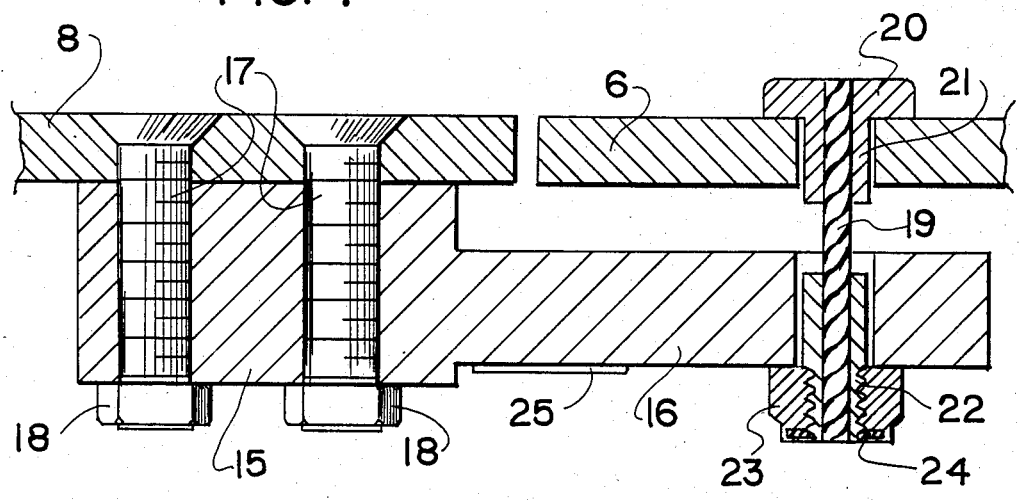
FIG. 4 is a vertical sectional view through the mounting of a disc on the platform through one of the load cells, this view being taken as indicated by the section line 4—4 on FIG. 1.

Each of the load cells comprises a structure and mounting arrangement as shown in FIGS. 3 and 4. Each load cell which interconnects a weighing disc with the platform comprises end portions 15 and 16 which are interconnected in the mid-region of the load cell and are of substantially different thickness or vertical dimension, as clearly appears in FIGS. 3 and 4. The relatively thick portion 15 is rigidly secured to the weighing disc 8 at radially spaced points by means of a pair of bolts 17 having fastening nuts 18 below the weighing discs and having the heads countersunk in the top surface of the weighing disc 8, as clearly appears in FIG. 4. The other end portion 16 of the load cell is of smaller vertical dimension than the portion 15 and is positioned toward the lower part ot the portion 15. Thus, the part 16 lies in spaced relation to the lower surface of the platform 6. The portion 16 of the load cell is suspended from the platform 6 by means of a flexible cable 19, the upper end of which is secured to the platform 6 by means of an attachment device 20 having sleeve 21 extended downwardly through an aperture provided in the platform 6. The lower end of the cable 19 is fastened to the outer end of the portion 16 of the load cell by means of the fastening sleeve 22 having a nut 23 threaded on the sleeve and preferably provided with a locking washer 24 in position to cooperate with the lower surface of the portion 16 of the load cell.

The above described configuration of each load cell, with the thick portion 15 secured to the weighing disc and with the thin portion 16 offset downwardly and suspended from the platform by the cable 19, provides an arrangement which minimizes the overall vertical dimension between the top surface of the weighing disc and the bottom of the load cell parts. This, in turn, permits employment of a platform for the weighing discs, which platform is located at a reduced dimension from the surrounding floor or other supporting surface; and this, in turn, facilitates shifting movement of articles to be weighed, such as chlorine gas tanks, from the surrounding floor area onto the weighing disc, and also the removal of such articles from the discs to the surrounding floor area.

It is also pointed out that the mounting of the thick part of the load cell to the weighing disc and the connection of the other end of the cell to the surrounding platform by means of the flexible cable is of special importance where the scale has two or more weighing discs, as in the embodiment herein disclosed, because where a plurality of weighing discs are used, the areas of the platform between the discs are subjected to distortions. Most of such distortions are readily accommodated by the flexible cable connections between the platform areas and the load cells, and in view of this, the distortions referred to do not adversely affect the readings provided by the cells, even where multiple weighing discs are provided in side-by-side relation and associated with a common platform.

This fastening and suspension arrangement of the load cells in relation to the weighing discs and the platform provides for downward deflection of the end 15 of the load cell with the weighing disc, when the cylinder or other object to be weighed is placed upon the weighing disc. On the underside of the mid-region of the load cell, preferably on the portion 16 thereof but close to the portion 15, a multiple component strain gauge 25 is mounted in order to sense deflections of the load cell in its mid-region as a result of placement of cylinders to be weighed on the weighing discs.

It will be noted that, as shown in FIGS. 3 and 4, each load cell is provided with a plurality of, preferably four, strain gauge components and further that these multiple components have a common mounting in one localized area of the load cell. This has substantial advantages as compared with arrangements in which multiple component strain gauges are employed but with the several components separately or individually mounted in different areas of the load cell. In Applicant's arrangement, the installation of the multiple component gauges is greatly simplified, both from the standpoint of mounting and from the standpoint of wiring, as compared with arrangements where individual components of a multiple gauge unit are mounted in different areas. It is also of advantage in Applicant's arrangement that the multiple component gauge is mounted on the underside of the load cell, in view of which the strain gauge is protected from deterioration by foreign matter tending to pass downwardly between the periphery of the weighing disc and the platform. The provision vision of the terminal connectors, shown at 25a in FIG. 3, on one of the side faces of the rectangular thick inner portion 15 of the load cell is also of importance in establishing the signal wiring required between the strain gauge components and the circuitry, such as shown in FIG. 5.

Figure 5:
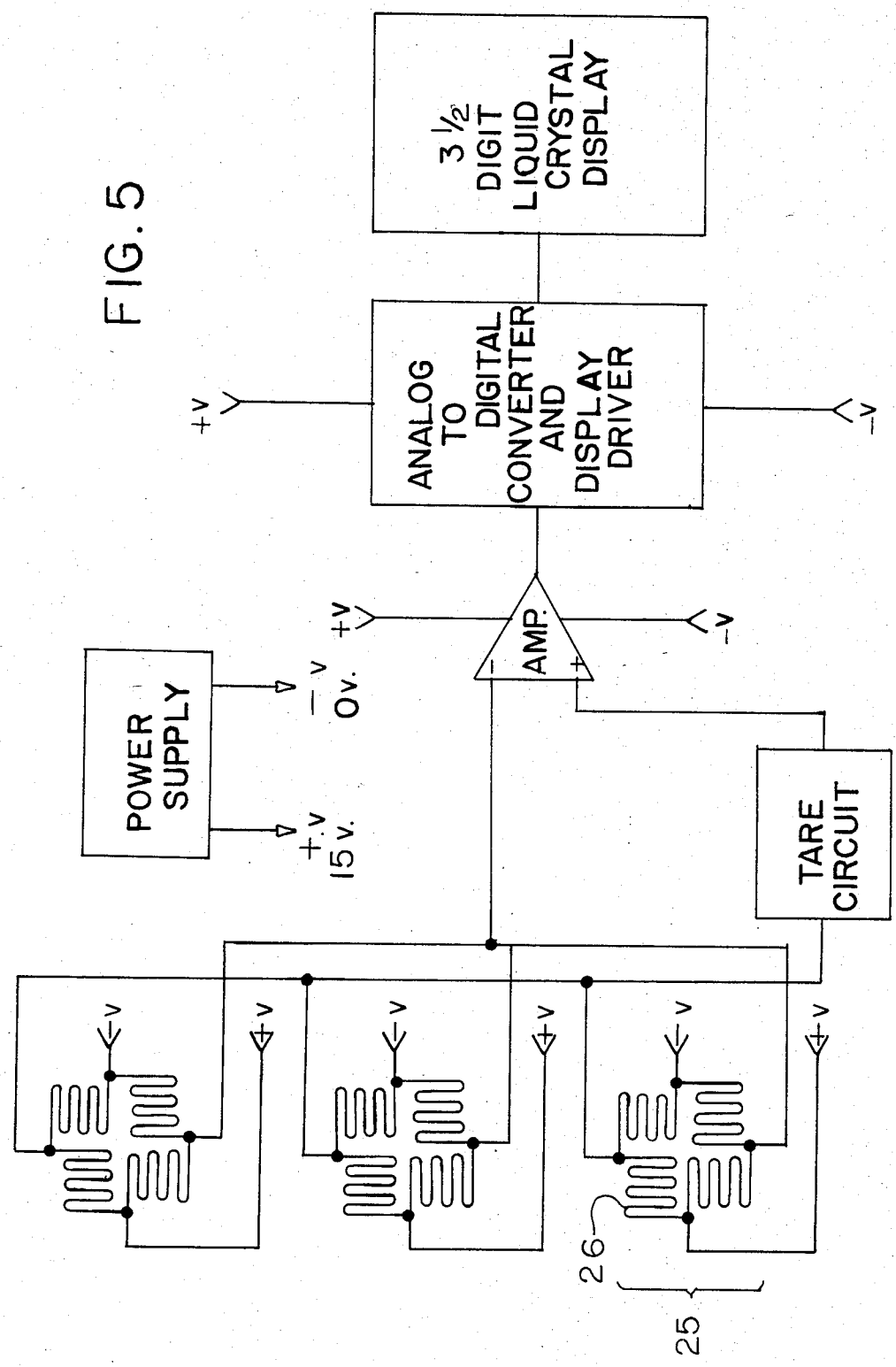
FIG. 5 is a schematic view illustrating the interrelation of the components of the individual load cells and the circuitry associated therewith for the purpose of providing the desired weight reading.

Preferably, the multiple component strain gauges incorporate elements physically positioned and interconnected in the manner clearly shown in the schematic diagram of FIG. 5. Three of such multiple component strain gauges are shown in FIG. 5 toward the left of the figure, these three comprising the three strain gauges mounted on the three load cells of one of the two weighing discs.

As will be seen from FIG. 5, four components 26 are included in each gauge, and the components each comprise a sinuous element lying in the common plane of the strain gauge. The several components are interconnected in a series, with the axis of sinuation of adjacent elements at 90° to each other. In the manner of a Wheatstone bridge, four connections are made with the components of each of the strain gauges, and these connections are clearly indicated in FIG. 3 and also in the schematic illustration of FIG. 5. As shown in FIG. 5, two of the connections are associated with the power supply, and the other two are associated with an amplifier, one of the amplifier connections being connected through a tare circuit. As is already known, signals of this type may then be delivered through other equipment for purposes of providing meter readings of the weights being measured.

We claim:

1. A scale comprising at least two weighing discs, a common platform for supporting the discs, with the discs arranged in side-by-side relation, and for each disc a set of three load cells for suspending the disc from the platform, the load cells of each set being equally spaced around the periphery of the disc, and each load cell of each set being elongated radially of the disc, with a first portion extended radially inboard below the periphery of the associated disc and with a second portion extended radially outboard of the periphery of the disc below a portion of the supporting platform, for each load cell of each set fastening means rigidly interconnecting the associated weighing disc and said first portion of the load cell at points spaced from each other radially of the associated disc, and for each load cell of each set means for connecting the load cell with the platform comprising a flexible cable connected with said second portion of the load cell, and for each load cell of each set a strain gauge mounted on the load cell intermediate said fastening means and connecting means.

2. A scale comprising a weighing disc, a supporting platform surrounding the disc, and three load cells for suspending the weighing disc from the platform, the load cells being equally spaced around the periphery of the weighing disc, and each load cell being elongated radially of the disc with a first portion extended radially inboard of the periphery of the disc and with a second portion extended radially outboard of the periphery of the disc below a portion of the supporting platform, the first portion of each load cell being relatively thick in a direction perpendicular to the platform and the second portion of each load cell being relatively thin in a direction perpendicular to the platform, first fastening means for each load cell comprising at least two fastening elements spaced radially of the weighing disc and interconnecting the weighing disc and said thick portion of the load cell, second fastening means for each cell interconnecting the platform and said second portion of the load cell, said second fastening means comprising a flexible cable connected with the load cell and with the platform radially outboard of the perimeter of the disc, and a strain gauge mounted on each load cell in a region between the fastening elements associated with the platform and with the weighing disc.

3. A scale comprising a weighing disc, a supporting platform surrounding the disc, and three load cells for suspending the weighing disc from the platform, the load cells being equally spaced around the periphery of the weighing disc, and each load cell being elongated radially of the disc with a first portion extended radially inboard of the periphery of the disc and with a second portion extended radially outboard of the periphery of the disc below a portion of the supporting platform, fastening means interconnecting the weighing disc and said first portion of the load cell at points spaced from each other radially of the disc, means for connecting the load cell with the platform comprising a flexible cable connected with said second portion of the load cell, and a strain gauge mounted on the load cell intermediate said fastening and connecting means.

4. A scale as defined in claim 3 in which a portion of each load cell between said fastening and connecting means has a substantially horizontal surface and in which said strain gauge is applied to said surface.

5. A scale as defined in claim 3 in which a portion of each load cell between the fastening and connecting means has a downwardly positioned substantially horizontal surface and in which said strain gauge is applied to said horizontal surface.

6. A scale as defined in claim 3 in which the portion of the load cell to which said cable is connected is spaced vertically below the platform and in which the cable is extended in the space between the platform and the load cell.

7. A scale comprising a weighing disc, a supporting platform surrounding the disc, and three load cells for suspending the weighing disc from the platform, the load cells being equally spaced around the periphery of the weighing disc, and each load cell being elongated radially of the disc with a first portion extended radially inboard of the periphery of the disc and with a second portion extended radially outboard of the periphery of the disc below a portion of the supporting platform, fastening means interconnecting the weighing disc and said first portion of the load cell, fastening means interconnecting the platform and said second portion of the load cell, one of said fastening means being connected with the load cell at points spaced from each other in a direction radially of the disc, and the other of said fastening means including a flexible cable connected with the load cell, and strain gauge means mounted on each load cell in a region between the fastening means associated with the platform and weighing disc, the gauge means for each load cell comprising four gauge elements, each comprising a multiple turn conductor with axes of the turns of two of the gauge elements being oriented at right angles to axes of the turns of the other two gauge elements.

8. A scale comprising a weighing disc, a supporting platform surrounding the disc, and three load cells for suspending the weighing disc from the platform, the load cells being equally spaced around the periphery of the weighing disc, and each load cell being elongated radially of the disc with a first relatively thick portion extended radially inboard of the periphery of the disc and with a second relatively thin portion extended radially outboard of the periphery of the disc below a portion of the supporting platform, fastening means for each load cell comprising at least two fastening elements spaced radially of the weighing disc and interconnecting the weighing disc and said thick portion of the load cell, second fastening means for each cell interconnecting the platform and said thin portion of the load cell, said second fastening means comprising a flexible cable connected with the load cell and with the platform radially outboard of the perimeter of the disc, and a strain gauge mounted on each load cell in a region of the thin portion thereof.

9. A scale comprising at least two weighing discs, a common platform for supporting the discs, with the discs arranged in side-by-side relation along a front edge of the platform over which the articles to be weighed are loaded onto the discs, and for each disc a set of three load cells for suspending the disc from the platform, the load cells of each set being equally spaced around the periphery of the disc with two of the cells presented toward said front edge of the platform, and each load cell of each set being elongated radially of the disc, with a first relatively thick portion extended radially inboard below the periphery of the associated disc and with a second relatively thin portion extended radially outboard of the periphery of the disc below a portion of the supporting platform, for each load cell of each set fastening means rigidly interconnecting the associated weighing disc and said first relatively thick portion of the load cell at points spaced from each other radially of the associated disc, and for each load cell of each set means for connecting the load cell with the platform comprising a flexible cable connected with said second relatively thin portion of the load cell, and for each load cell of each set a strain gauge mounted on the relatively thin portion of the load cell intermediate said flexible cable and the relatively thick portion of the load cell.

* * * * *